March 7, 1961 D. COHN 2,973,573
APPARATUS FOR FASTENING EYES IN DOLLS' HEADS
Filed Nov. 7, 1958 2 Sheets-Sheet 1
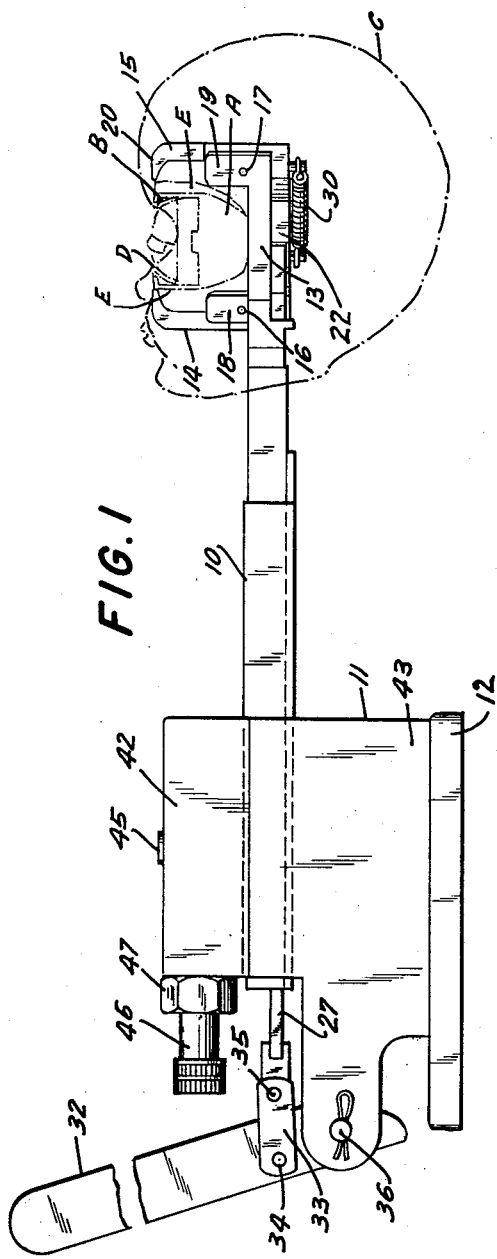
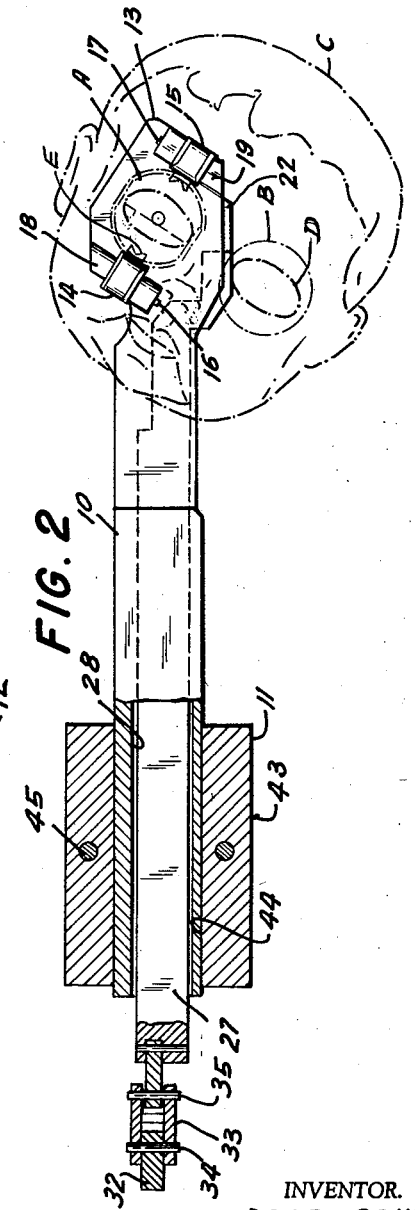
INVENTOR.
DAVID COHN
BY
*Clark+Ott*
ATTORNEYS March 7, 1961 D. COHN 2,973,573
APPARATUS FOR FASTENING EYES IN DOLLS' HEADS
Filed Nov. 7, 1958 2 Sheets-Sheet 2
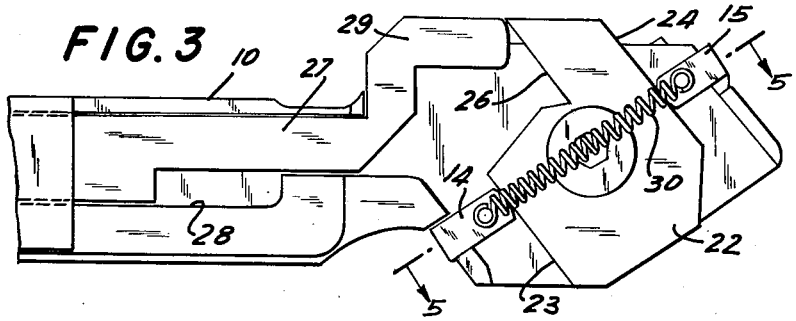
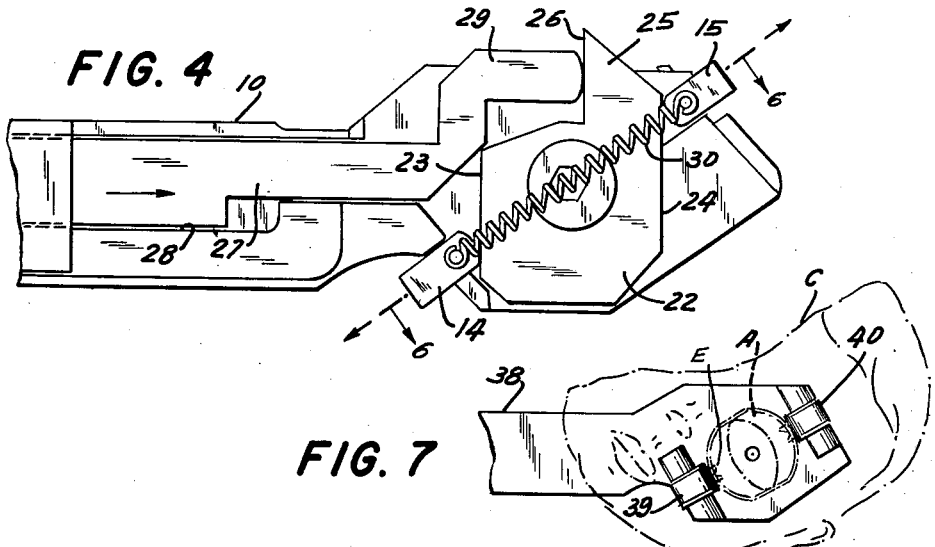
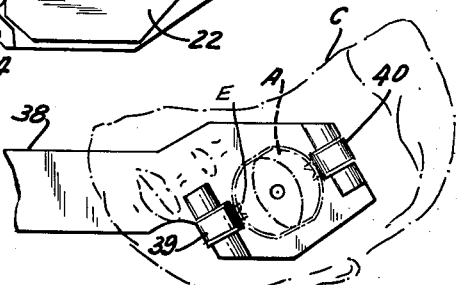
FIG. 7
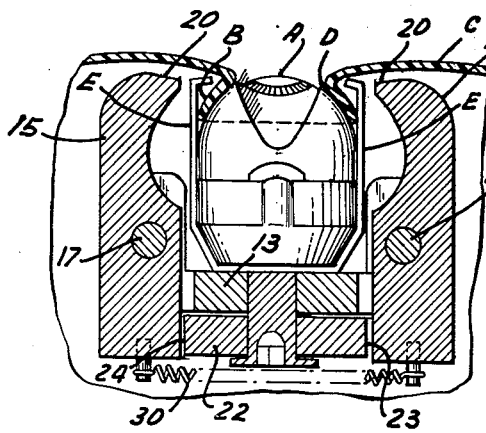
FIG. 5
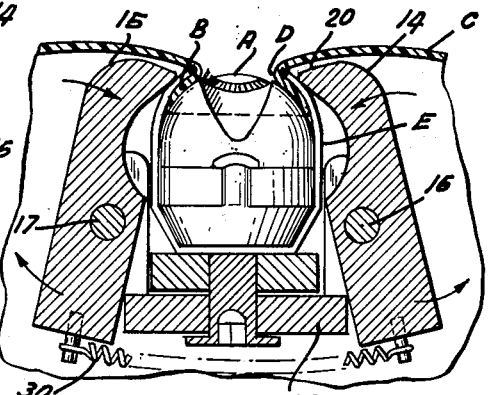
FIG. 6
INVENTOR.
DAVID COHN
BY Clark+Ott
ATTORNEYS United States Patent Office 2,973,573
Patented Mar. 7, 1961

2,973,573

APPARATUS FOR FASTENING EYES IN DOLLS' HEADS

David Cohn, Poundridge, N.Y., assignor to Model Plastic Corporation, White Plains, N.Y., a corporation of New York Filed Nov. 7, 1958, Ser. No. 772,538

4 Claims. (Cl. 29—209)

This invention relates to an apparatus for fastening doll's eyes in position in dolls' heads.

An object of the invention is to provide an apparatus for conveniently, expeditiously and securely fastening eye constructions in dolls' heads.

Dolls' heads made in accordance with the method described in applicant's pending application for Method and Apparatus for the Production of Hollow Articles, Serial No. 766,544, filed October 10, 1958, are formed with peripheral lips or rims extending inwardly from the peripheral edge portion of the front wall of the head surrounding the eye openings and providing semi-spherical sockets within the head with the eye openings located substantially at the centers thereof respectively. The semi-spherical sockets are provided for receiving eye constructions including casings having eye members pivotally mounted therein respectively and which casings have gripping tongues adapted to be clamped on the peripheral lips or rims for securing the eye mountings in the sockets with the eye members located at the eye openings in the doll's head. The present invention, therefore, provides an apparatus for clamping the tongues on the lips or rims with the eye constructions positioned in the sockets.

A further object of the invention is to provide an apparatus of said character having an arm adapted for receiving a doll's head on the outer end thereof with the face arranged uppermost and the arm extending through the neck opening and having oppositely disposed jaws adapted to receive an eye construction therebetween with the jaws engaging against the gripping tongues and with handle means located exteriorly of the head for actuating the jaws to clamp the tongues against the peripheral lips or rims.

Another object of the invention is to provide the head with cam means and with a slide mounted for reciprocatory movement in the arm and which engages the cam means for imparting inward movement to the free ends of the jaws with movement of the handle to thereby bend the tongues of the eye construction into clamping engagement on the inwardly directed rims surrounding the eye openings in the doll's head.

With the foregoing and other objects in view, reference is now made to the following specification and accompanying drawings in which the preferred embodiment of the invention is illustrated.

In the drawings:

Fig. 1 is a view in elevation of an apparatus embodying the invention and shown with a doll's head in broken lines in position thereon for attaching an eye construction thereto.

Fig. 2 is a top plan view thereof with one end of the apparatus shown in section.

Fig. 3 is an enlarged under side view of the head showing the position of the cam means and slide when the clamping jaws are in outward relation.

Fig. 4 is a similar view showing the cam means and the slide when the jaws move to inward relation.

Fig. 5 is an enlarged sectional view taken approximately on line 5—5 of Fig. 3.

Fig. 6 is a similar view taken approximately on line 6—6 of Fig. 4.

Fig. 7 is a fragmentary top plan view of the arm employed for attaching an eye construction for the left eye.

The apparatus is adapted for attaching eye constructions A to inwardly directed lips or rims B formed integrally with doll's heads C and extending inwardly peripherally about the eye openings D and which provide semi-spherical sockets within the head.

Each of the eye constructions A includes a metal casing having a forward portion of substantially semi-spherical formation adapted to fit one of the sockets and with an eye member pivotally mounted within the eye construction and visible through an opening in the forward wall thereof, which opening is disposed in registry with an eye opening in the doll's head. The eye construction is provided with oppositely disposed metal tongues E which engage over the lip or rim B and with prongs on the tongues embedded therein so as to retain the eye construction in position in the socket.

The apparatus includes an arm 10 on which the doll's head is positioned with the arm extending through the neck opening and with the face of the doll uppermost in order to conveniently register an eye opening with an eye construction held by the arm. The arm 10 is removably affixed to a pedestal 11 having a base 12 for attachment to a support. The arm 10 includes a head 13 on which oppositely disposed jaws 14 and 15 are swingably mounted on pins 16 and 17 between upstanding posts 18 and 19 respectively. The posts 18 and 19 are spaced apart a distance to receive an eye construction therebetween in supported relation on the head 13 and the jaws are curved inwardly at their upper ends as at 20 to extend over the lip or rim B of the doll's head with the inward swinging of the jaws. The jaws 14 and 15 project below the head 13 and are engaged by a cam member 22 pivoted to the under side of the head centrally between the lower ends of the jaws. The cam member 22 is formed with parallel side edges 23 and 24 and with a tongue 25 having a side edge 26 disposed in parallel relation with the side edges 23 and 24 thereof. A slide 27 slidable in a slot 28 in the arm 10 is formed with an offset outer end 29 against which the tongue 25 is biased by a spring 30. The slide 27 protrudes through the pedestal 11 and is connected with a handle member 32 by a link 33 which is pivoted to the slide and handle on pins 34 and 35 respectively. The handle is pivoted to the pedestal on a pin 36 for swinging movement thereof to effect movement of the slide in one direction to turn the cam member 22 to thereby swing the jaws inwardly and for movement of the arm in the opposite direction for effecting outward movement of the jaws.

The jaws 14 and 15 are arranged in a plane extending across the head 13 at an angle of approximately 30° to the longitudinal medial line of the arm 10 and with the forward jaw 15 located on the right side of the medial line for attaching an eye construction for the right eye as shown in Fig. 2 of the drawings. For attaching an eye construction for the left eye, the arm 10 is removed and an arm 38 is substituted therefor which is similar in construction to the arm 10 but with the jaws 39 and 40 arranged in a plane extending at approximately an angle 30° to the longitudinal medial line through the arm 38 and with the forward jaw 40 located to the left of the medial line as illustrated in Fig. 7 of the drawings.

The pedestal 11 includes upper and lower portions 42 and 43 which are slotted as at 44 to receive either one of the arms 10 and 38 therebetween in secured position on the pedestal. The upper portion 42 is releasably secured to the lower portion by screws 45 which permits of the convenient removal of the upper portion for replacing either one of said arms with the other. The upper portion 42 is provided with a threaded stud 46 which projects therefrom and provides a stop for limiting the inward movement of the handle member 32 and slide 27. The stud is adjustable for varying the spacing of the outer end thereof from the handle member 32 and is secured in set position by a lock nut 47.

In using the apparatus for attaching an eye construction for the right eye, an eye construction is positioned on the head of the arm 10 with the metal tongues E engaged by the jaws 14 and 15 respectively as shown in Figs. 1 and 2 of the drawings. A doll's head C is positioned on the arm with the face uppermost and with the eye member in registry with the right eye opening and the eye construction disposed in the socket formed by the lip or rim B extending inwardly from the right eye opening. The handle member 32 is then moved inwardly so as to effect inward movement of the jaws 14 and 15 to thereby bend the tongues E inwardly into overlying relation with the lip or rim B and to embed the prongs of the tongue into the body of the head at the juncture of the lip or rim therewith. The handle member 32 is then swung outwardly so as to free the jaws from the fastened eye construction. When a quantity of the dolls' heads C have been supplied with eye constructions for the right eyes, the arm member 10 is removed and the arm 38 substituted therefor. The apparatus is then used in a similar manner to supply the dolls' heads C with eye constructions for the left eyes.

While the preferred form of the invention has been shown and described herein, it is to be understood that the same is not so limited but shall cover and include any and all modifications thereof which fall within the purview of the invention.

What is claimed is:

1. In an apparatus for fastening eye constructions having outwardly extending tongues to dolls' heads of the type provided with peripheral rims extending inwardly from the edges of the eye openings respectively, said apparatus including a support, an arm carried by said support, oppositely disposed jaws pivoted to said arm and having inwardly directed outer ends between which an eye construction is positioned on said arm with the tongues thereof disposed between the outer ends of said jaws, cam means pivotally mounted on said arm, a slide slidably mounted on said arm with the outer end thereof disposed in engagement with said cam means, and a handle member movably carried by said support and engaging said slide for movement of said cam means to rock said jaws inwardly, and said arm being adapted to receive a doll's head thereon with the arm extending through the neck opening and with an eye opening disposed in registry with the eye construction on said arm for bending the tongues into clamping relation on the rim of said eye opening with the inward movement of said jaws to thereby secure said eye construction to the doll's head.

2. In an apparatus for fastening eye constructions having outwardly extending tongues to dolls' heads of the type provided with peripheral rims extending inwardly from the edges of the eye openings respectively, said apparatus including a support, an arm carried by said support, oppositely disposed upstanding jaws pivoted to said arm and having inwardly directed outer ends between which an eye construction is positioned on said arm with the tongues thereof disposed between the outer ends of said jaws, cam means pivotally mounted on the under side of said arm between the lower ends of said jaws, a slide slidably mounted on the under side of said arm with the outer end thereof disposed in engagement with said cam means, and a handle member movably carried by said support and engaging said slide for movement of said means to rock the outer ends of said jaws inwardly, and said arm being adapted to receive a doll's head thereon with the arm extending through the neck opening and with an eye opening disposed in registry with the eye construction on said arm for bending the tongues into clamping relation on the rim of said eye opening with the inward movement of said jaws to thereby secure said eye construction to the doll's head.

3. In an apparatus for fastening eye constructions having outwardly extending tongues to dolls' heads of the type provided with peripheral rims extending inwardly from the edges of the eye openings respectively, said apparatus including a support, an arm carried by said support, oppositely disposed jaws pivoted to said arm for inward swinging movement towards each other, said jaws having inwardly directed outer ends between which an eye construction is positioned on said arm with the tongues thereof disposed between the outer ends of said jaws, cam means pivotally mounted on said arm between the lower ends of said jaws, a slide mounted on said arm with the outer end thereof disposed in engagement with said cam means, and a handle member movably carried by said support and engaging said slide for movement of said cam means to rock said jaws inwardly, means biasing said jaws to normally maintain the outer ends thereof in outward relation and the lower ends of said jaws in biased engagement with said cam means and said cam means in biased engagement with said slide, and said arm being adapted to receive a doll's head thereon with the arm extending through the neck opening and with one of the eye openings disposed in registry with the eye construction on said arm for bending the tongues into clamping relation on the rim of said eye opening with the inward movement of said jaws to thereby secure said eye construction to the doll's head.

4. In an apparatus as set forth in claim 1 in which the arm is removably carried by the support and the jaws are mounted for swinging movement in angular relation to the longitudinal center line of the arm for fastening the tongues of an eye construction to the rim extending inwardly from one of the eyes of a doll's head and said arm being replaceable by another arm in which the jaws thereof are mounted for swinging movement in angular relation to the longitudinal center line of the arm in a direction opposite to the angular relation of the jaws of said first mentioned arm, and said last mentioned arm being adapted for fastening the tongues of an eye construction on the rim of the other eye of the doll.

References Cited in the file of this patent

UNITED STATES PATENTS

| | | |
|---|---|---|
| 620,251 | Pratt | Feb. 28, 1899 |
| 1,849,352 | Konoff | Mar. 15, 1932 |
| 1,861,050 | Cesare | May 31, 1932 |
| 1,955,949 | Colton | Apr. 24, 1934 |